United States Patent [19]
Eberhardt

[11] 4,144,605
[45] Mar. 20, 1979

[54] FISH TACKLE TOOL

[76] Inventor: Elwood L. Eberhardt, 4281 Norwalk Dr. #108, San Jose, Calif. 95129

[21] Appl. No.: 812,484

[22] Filed: Jul. 5, 1977

[51] Int. Cl.² ............................................. B25F 1/00
[52] U.S. Cl. ...................................... 7/106; 29/241; 30/135
[58] Field of Search ............... 7/1 H; 30/135; 223/99; 29/241

[56] References Cited
U.S. PATENT DOCUMENTS

| 2,254,738 | 9/1941 | Gamache | 30/175 |
| 3,357,086 | 12/1967 | Hood | 29/241 |
| 3,754,290 | 8/1973 | Nicholson | 7/1 H |

Primary Examiner—James L. Jones, Jr.
Assistant Examiner—James G. Smith
Attorney, Agent, or Firm—Schatzel & Hamrick

[57] ABSTRACT

A fish tackle tool including a line cutter having a slotted base portion and a blade portion which cuts fishing line placed in the base slots and a wedge shaped line threader which holds a hook and has a slot for guiding a fishline through the eyelet of the hook.

14 Claims, 5 Drawing Figures

U.S. Patent  Mar. 20, 1979  4,144,605
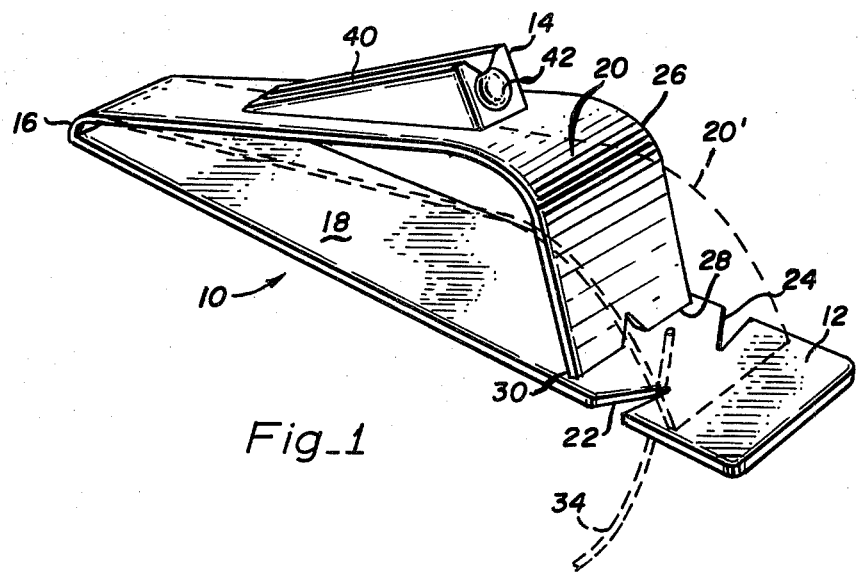
Fig_1
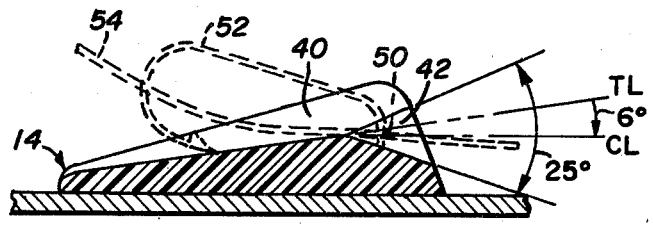
Fig_2
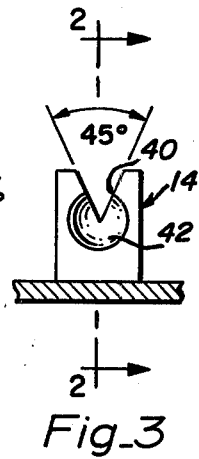
Fig_3
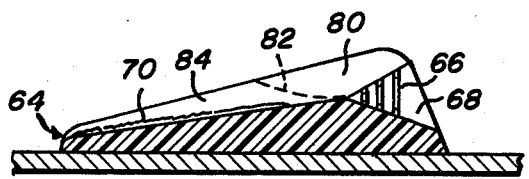
Fig_4
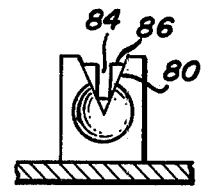
Fig_5

FISH TACKLE TOOL

BACKGROUND OF THE INVENTION

1. Field of the Invention

The present invention relates generally to fishing tools and more particularly to a combined fishhook threader/fishline cutter device.

2. Discussion of the Prior Art

Fishhook threaders are well known in the prior art. Typical of such devices is that disclosed in the U.S. Pat. No. 3,357,086 to E. P. Hood, which teaches the use of a split funnel to guide a line into the eyelet of a fishhook held in a U-shaped trough by a pair of deformable blocks. After the fishhook has been threaded, the fishhook and line must be removed from the threader to be tied. Although quite easy to use, the Hood device is not so easy to manufacture and as a result is relatively expensive.

Another difficulty with fishhook threaders found in the prior art is that they support the fishhook only at one point, usually at the eyelet. Such an arrangement may give inadequate support under some conditions, such as when trying to fit a line through an eyelet opening only slightly larger than the line diameter, or under conditions of substantial vibration.

A further problem that the prior art does not address is how to provide a means which allows the threaded hook to be tied without removing the hook and line from the threader. Yet another problem that the prior art does not address is how to provide a means which enables one to conveniently cut the fishing line in preparation for or after the act of threading the fishhook.

SUMMARY OF THE INVENTION

It is therefore, an object of this invention to provide a fish tackle tool which combines the characteristics of a fishline cutter and a fishhook threader to expedite the threading and tying process.

It is another object of this invention to provide a fish tackle tool that is of simple, rugged design so as to minimize cost and difficulty of manufacture, while maximizing reliability.

It is a further object of this invention to provide a fish tackle tool that securely holds the fishhook in position for threading under a variety of adverse conditions.

It is yet a further object of this invention to provide a fishhook threader which allows a threaded fishhook to be tied without removal from the threader.

The above objects have been met by my present invention which in a preferred embodiment includes a unitary cutting member having an elongated base portion, provided with slots receptive to fishing line, and a flexible blade portion, having a cutting edge at one end, the blade being connected to, or formed integral with, the elongated base, and a wedge shaped threading member, also of unitary construction connected to a midpoint of the blade portion. Pressure applied to the blade portion or to the wedge shaped member urges the blade's cutting edge or edges across the slots in the base so as to sever a fishing line placed therein. The wedge shaped member includes a conically shaped recess at one end for holding the eyelet of a fishhook, and a guide groove extending the length of the member for accurately guiding the line to the eyelet of the fishhook. The fishhook need not be removed for tying.

These and other objects and advantages of the present invention will no doubt become apparent after a reading of the following detailed description of the preferred embodiment which is illustrated in the several figures of the drawing.

IN THE DRAWING

FIG. 1 is a perspective view showing a fish tackle tool in accordance with the present invention;

FIG. 2 is a cross sectional view taken along the line 2—2 of FIG. 3 to illustrate the hook threading portion of the tackle tool shown in FIG. 1.

FIG. 3 is an end view further illustrating an alternate embodiment of the hook threading portion of the tackle tool shown in FIG. 1.

FIG. 4 is a sectional view similar for FIG. 2 illustrating another modified embodiment.

FIG. 5 is an end view illustrating another modified embodiment of the hook threading portion of the tackle tool shown in FIG. 1.

DESCRIPTION OF THE PREFERRED EMBODIMENT

Referring now to FIG. 1 of the drawing there is shown a perspective view of a fish-tackle tool 10 in accordance with a preferred embodiment of the present invention. The tool is essentially comprised of a line cutter 12, and a hook threader 14 which also serves as a thumb piece for the cutter 12. Cutter 12 is made of a length of resilient sheet metal stock which is bent back upon itself at 16 to define a base portion 18 and a blade portion 20. The base 18 is provided with a pair of side slots 22 and 24 which are angled toward the forward end of base 18. The blade portion 20 is bowed as indicated at 26, so that the end 28 contacts the upper surface of the base 18, and at rest is positioned slightly behind the slots 22 and 24. Depending upon the thickness of the metal stock, the edge 28 may be sharpened by back filing as illustrated at 30 or may be left as a mere squared cross cut. Similarly, the slots 22 and 24 may be sharpened, but for small size fishline this has not been found necessary. Although not a necessary feature of the cutting edge, a notch 32 may also be provided so as to separate edge 28 into left and right segments.

In operation, a length of fishing line 34 to be cut is inserted into one of the notches 22 or 24 and thumb pressure is applied to the top of threader 14 so as to cause the blade portion 20 to be depressed downwardly causing edge 28 to slide along the upper surface of base 18 and over slots 22 and 24 as illustrated by dashed lines 20' and to shear the line 34 as it comes in contact therewith.

Affixed to the top of blade portion 20 by any suitable fastening means is the threader 14 which is preferably made of a firm but somewhat resilient plastic material. As viewed from the side, threader 14 is generally triangular in shape, and as is perhaps more clearly illustrated in FIGS. 2 and 3, a V-shaped groove 40 is provided in the top surface and a conical recess 42 is provided in the front surface thereof. As shown in FIG. 2, the apex and axis or center line CL of conical recess 42 intersects the trough line TL of groove 40 at an angle of approximately 6° as measured in a vertical plane. Although there is room for substantial variation, in the angle of intersection mentioned above, the trough angle and the cone angle, in the preferred embodiment the trough angle is 45° as illustrated in FIG. 3, and the cone angle is approximately 25° as illustrated in FIG. 2.

The purpose of recess 42 is to provide a means for receiving the eyelet 50 of a hook 52 such as is illustrated in dashed lines, while the purpose of groove 40 is to provide a guideway for a fishline, as is illustrated by the dashed lines 54, so that the line can be threaded through the eyelet as indicated. Groove 40 also serves as a means for seating the barbed tip of hook 52. Since threader 14 is made of a resilient material it will be appreciated that by drawing the hook leftwardly as viewed in FIG. 2 and forcing the hook point down against the trough of groove 40, the hook tip will mechanically interact with the resilient body to either pierce or dimple it so as to hold the hook in the threading position indicated. Once the line 54 has been passed through eyelet 50 it may then be tied in place or the untied hook and line may be removed and tied.

In FIG. 4 a modified embodiment of the threader is shown at 64. In this embodiment spaced apart, circular ridges or grooves 66 are provided in the face of the recess 68 to provide a better gripping relationship between the threader 64 and the eyelet of a hook to be received therein. Another feature which might be found suitable for those cases where the material selected for threader 64 is quite firm is the provision of a softer plastic material in the bottom of the trough as indicated at 70. The soft material is for engagement by a hook point so as to prevent bending of the relatively delicate tip.

Still another possible modification is illustrated in FIG. 5 and by the dashed line 82 in FIG. 4. In this embodiment the V-shaped groove is only provided in the region 80 to the right of dashed line 82 and a narrowed hook tip receiving slot is provided to the left side of line 82 as indicated at 84 (see FIG. 5). The sidewalls 86 which border groove 84 tend to assist in holding the hook in an upright position when it is mounted on the threading device.

Although several preferred configurations of the various component parts of the subject tool have been illustrated in the drawing, it is contemplated that additional modifications and alterations could be made thereto. For example, in one alternate embodiment, more than the illustrated two side slots 22 and 24 could be provided to accomodate different sizes of line to be cut. In another embodiment, holes might be substituted for the side slots 22 and 24. In addition, the particular configuration of base portion 18 and blade portion 20 could be modified as well as could be external configuration of threader 14. It will of course, also be appreciated that either component part of the illustrated tool could be used independently of the other.

It is therefore intended that the illustrated embodiments not be taken as limiting, but instead by way of example only, and that the apended claims be interpreted as covering all such alterations and modifications as fall within the true spirit and scope of the invention.

What is claimed is:

1. A fish tackle tool, comprising:
   means forming an elongated base member having at least one slot provided therein for receiving a line to be cut;
   means forming an elongated bowed blade member having one end affixed to said base member and the opposite end forming a cutting edge normally engaging a surface of said base member on one side of said slot and sliding along said base member across said slot when a force is applied to a said blade member tending to straighten it out; and
   a threading member affixed to said blade member proximate its midpoint and including an upper surface having a longitudinal groove formed therein, and an end surface having a conically shaped recess formed therein such that the axis of said recess angularly intersects the bottom surface of said groove, whereby said recess forms a means for receiving and holding the eyelet of a fishhook and said groove forms a means for guiding a fishline through the eyelet of the hook.

2. A fish tackle tool as recited in claim 1, wherein said slot is formed in a side of said base member and extends inwardly and forwardly toward the end of said base member most remote from where said blade member is affixed.

3. A fish tackle tool as recited in claim 1 wherein said threading member is formed of a resilient material and has a generally triangular shape as viewed in side elevation.

4. A fish tackle tool as recited in claim 3, wherein said groove has a generally V-shaped transverse cross-section and the bottom of said groove intersects the apex of said recess.

5. A fish tackle tool as recited in claim 1, wherein the portions of the end surface forming said recess have circular ridges formed therein providing means for matingly receiving the eyelets of various size hooks.

6. A fish tackle tool as recited in claim 1, wherein said groove has a generally V-shaped transverse cross-section and the bottom line at the bottom of said groove intersects the apex of said recess.

7. A fish tackle tool as recited in claim 1, wherein the axis of said recess intersects the bottom line at the bottom of said groove at an angle of approximately 6°.

8. A fish tackle tool as recited in claim 6, wherein a soft, resilient material is provided along at least a portion of said bottom line to provide a means for receiving the tip of a hook mounted thereon.

9. A fish tackle tool as recited in claim 1, wherein said base member and said blade member are integrally formed from a single length of sheet material.

10. A fish tackle tool as recited in claim 6, wherein the cone angle of said recess is approximately 25°.

11. A fish tackle tool comprising a unitary generally triangular shaped body as viewed from one side, said body having a base surface, an upper surface, and an end surface, said upper surface having a longitudinally extending groove formed therein, said groove being generally V-shaped in transverse cross-section, and said end surface having a conically shaped recess formed therein such that the axis of said recess angularly intersects the bottom of said groove, said conically shaped recesses having circular ridges provided in the surface thereof for matingly receiving the eyelets of various size books.

12. A fish tackle tool as recited in claim 11 wherein said body is formed of a resilient material.

13. A fish tackle tool as recited in claim 11 wherein the cone angle of said recess is approximately 25°.

14. A fish tackle tool comprising a unitary generally triangular shaped body as viewed from one side, said body having a base surface, an upper surface, and an end surface, said upper surface having a longitudinally extending groove formed therein, said groove being generally V-shaped in transverse cross-section and having a soft, resilient material provided along at least a portion of said groove to provide a means for receiving the tip of a hook mounted thereon, and said end surface having a conically shaped recess formed therein such that the axis of said recess angularly intersects the bottom of said groove.

* * * * *